(12) United States Patent
Maffeis

(10) Patent No.: US 7,976,087 B2
(45) Date of Patent: Jul. 12, 2011

(54) LINEAR PNEUMATIC GRIPPER

(75) Inventor: Giuseppe Maffeis, Roncadelle (IT)

(73) Assignee: Gimatic S.p.A., Roncadelle (Brescia) (IT)

( * ) Notice: Subject to any disclaimer, the term of this patent is extended or adjusted under 35 U.S.C. 154(b) by 297 days.

(21) Appl. No.: 12/264,510

(22) Filed: Nov. 4, 2008

(65) Prior Publication Data

US 2009/0127879 A1    May 21, 2009

(30) Foreign Application Priority Data

Nov. 15, 2007   (IT) .............................. BS07U000046

(51) Int. Cl.
*B25J 15/08*   (2006.01)
(52) U.S. Cl. ...................................... 294/88; 294/119.1
(58) Field of Classification Search .................... 294/88, 294/119.1; 414/741; 269/32, 34; 901/37
See application file for complete search history.

(56) References Cited

U.S. PATENT DOCUMENTS

| 2,817,254 | A | * | 12/1957 | Barnes et al. ................. 228/3.1 |
| 4,629,237 | A | * | 12/1986 | Ito ................................... 294/88 |
| 5,938,257 | A | * | 8/1999 | Blatt .............................. 294/88 |
| 6,092,848 | A | * | 7/2000 | Maffeis et al. ................. 294/88 |
| 6,193,292 | B1 | * | 2/2001 | Maffeis et al. ................. 294/88 |
| 6,318,779 | B1 | * | 11/2001 | Hanne et al. ................... 294/88 |
| 6,428,070 | B1 | * | 8/2002 | Takanashi et al. ............. 294/88 |

FOREIGN PATENT DOCUMENTS

JP           406031673 A  *  2/1994

* cited by examiner

*Primary Examiner* — Dean J Kramer
(74) *Attorney, Agent, or Firm* — McGlew and Tuttle, P.C.

(57) ABSTRACT

The invention concerns a linear pneumatic gripper that has a gripper body comprising a base element (11), in which a chamber (18) has been provided for a piston (12) and which supports two drive levers (13) oscillating on relative fulcrums or pins (24) and connected to the piston, and a guide head (14) associated with the base element and having a guide groove for two jaws connected to the drive levers. The guide head is fixed to the base element of the gripper body by the oscillation fulcrums or pins (24) of the drive levers.

2 Claims, 4 Drawing Sheets

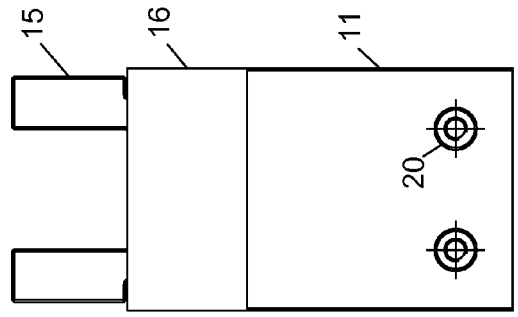
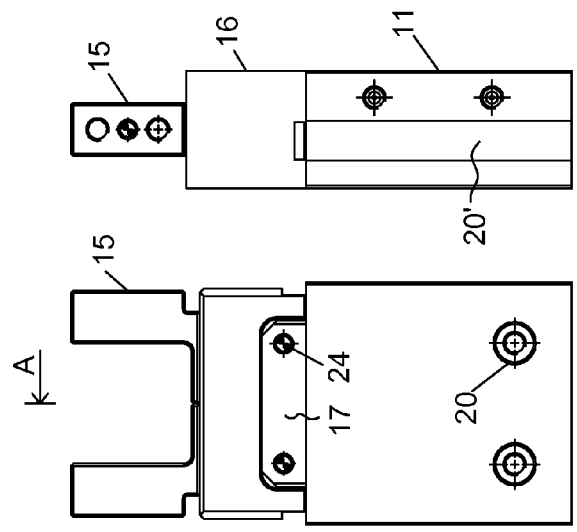
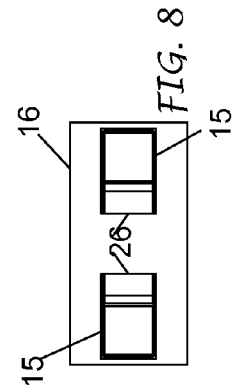
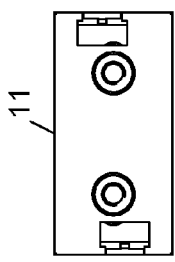
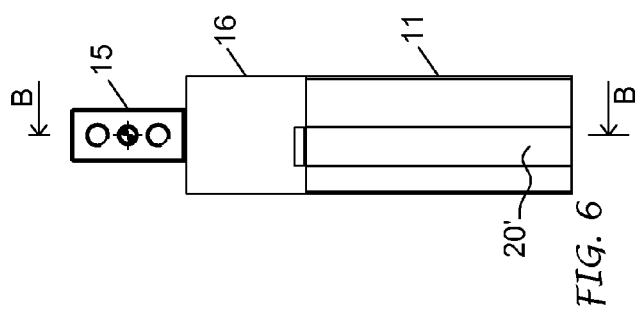

LINEAR PNEUMATIC GRIPPER

FIELD OF THE INVENTION

This invention concerns in general the pneumatic gripper sector used for gripping items being machined and/or for automatic handling, and refers in particular to a type of pneumatic gripper that has a pair of jaws which move linearly in opposite directions to open and close by means of a pneumatic control piston with single or double action.

STATE OF THE TECHNIQUE

The linear pneumatic grippers for the above use are well known, both as regards to how they are structured and how they function. They can differ in form, dimensions and capacity.

The type of pneumatic grippers taken into consideration in this case, basically comprise a body forming a chamber, a piston positioned and moving alternately in said chamber under the action of a fluid under pressure, and a pair of gripper jaws associated with said body and movable in opposite directions. The piston is connected to the jaws by means of operating levers, assembled by means of fulcrums or oscillation pins, so that the movements of the piston correspond to the linear movements of the jaws to open and close them.

However, the linear grippers known up to now are made up of several elements which are assembled also with the use of bolts and that for their combination they can be the cause of defects in the function of the gripper; in fact, possible dimension errors in the single components and/or the coupling tolerances may also considerably influence the precision and parallelism of the movement of the jaws.

OBJECTS AND SUMMARY OF THE INVENTION

Starting from this introduction, one object of the present invention is to avoid the above mentioned drawbacks and disadvantages, and therefore to provide a linear pneumatic gripper made up of a limited number of components and where some components have a dual function.

Another object of the invention is to provide a linear pneumatic gripper whose assembly does not require the use of bolts and where the fulcrums or pins of the drive levers help in forming a rigid and safe connection of the components forming the body of the gripper.

Said objects are achieved with a linear pneumatic gripper, wherein the body comprises a base element in which a chamber is provided for the piston and which holds the oscillation drive levers on relative transverse pins, and a head associated with said body and with guide groove for the jaws, and wherein such a head is fixed to said base element by means of the same oscillation fulcrums or pins of said levers with a preset preload.

In this way the oscillation pins of the jaws have at the same time the additional function of connecting and blocking the components to form the gripper body and which can also be achieved using different materials, thus enabling a simpler and less expensive manufacture of the device.

BRIEF DESCRIPTION OF THE DRAWINGS

This invention will however be illustrated in greater detail in the continuation of this description made in reference to the enclosed indicative and not limitative drawings, in which:

FIGS. 4 to 9 respectively show views of the pneumatic gripper from every side, top and bottom;

DETAILED DESCRIPTION OF THE INVENTION

Figure 1:
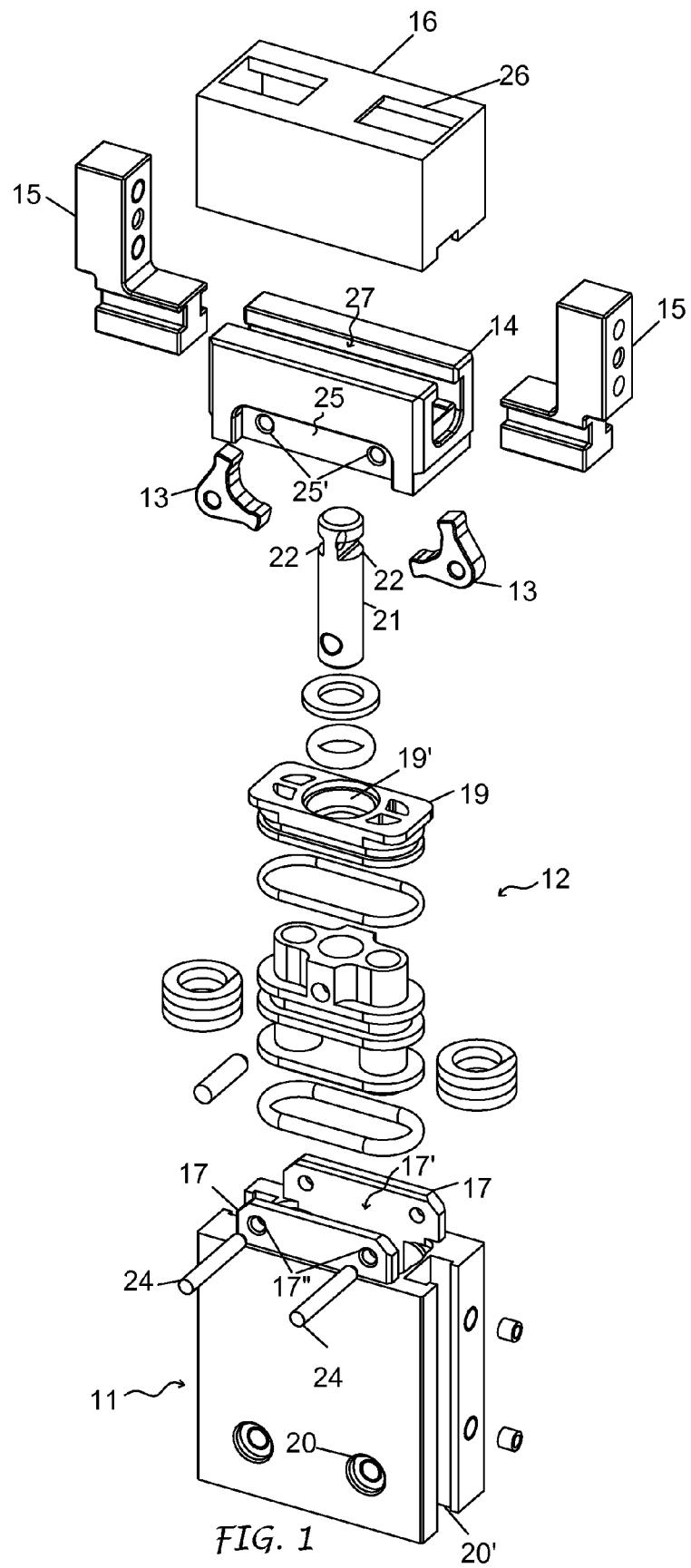
FIG. 1 is an exploded view in perspective of the components of the linear pneumatic gripper.
Figure 3:
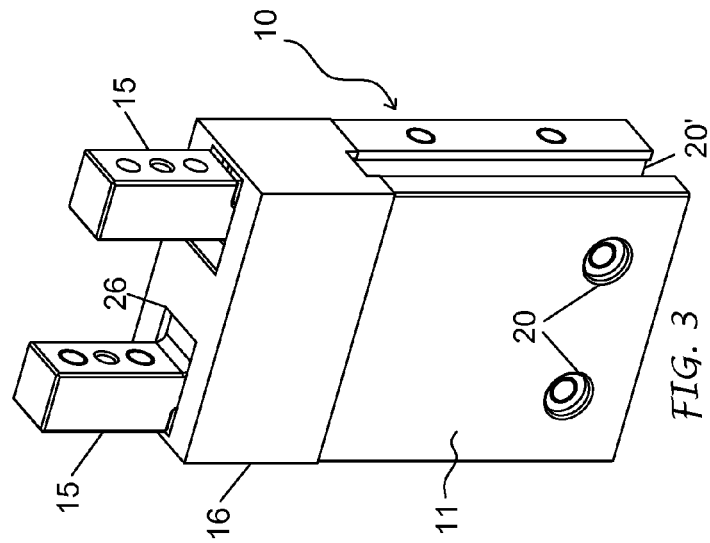
FIG. 3 is a view in perspective of the assembled linear pneumatic gripper.
Figure 2:
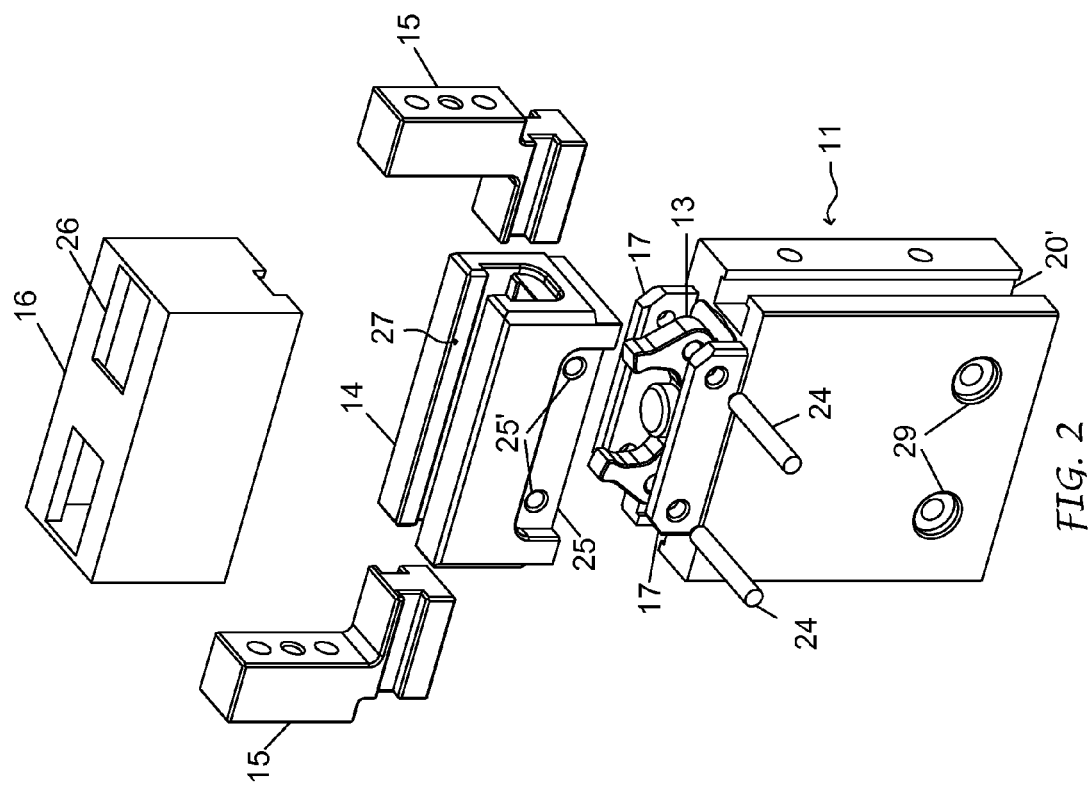
FIG. 2 is a view in perspective of the semi-assembled linear pneumatic gripper.
Figure 10:
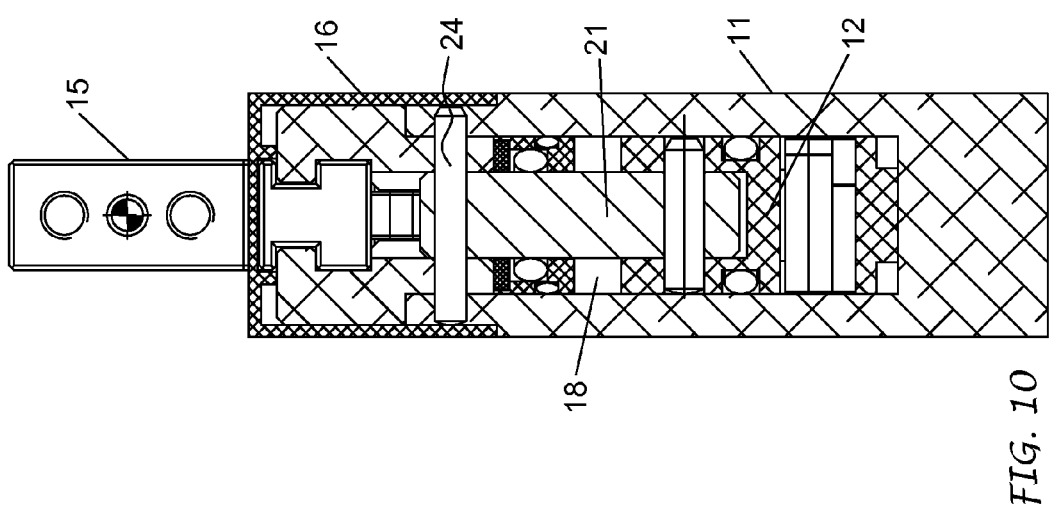
FIG. 10 is, enlarged, a cross section of the pneumatic gripper according to arrows A-A in FIG. 4.
Figure 11:
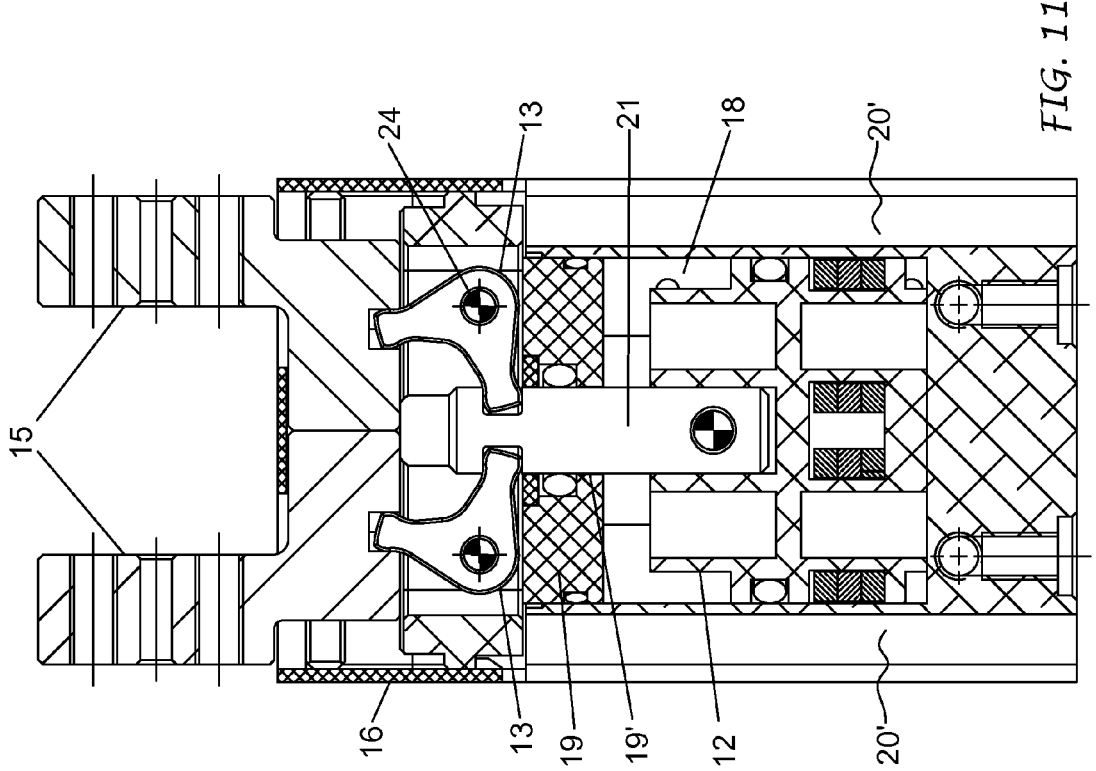
FIG. 11, is an enlarged a cross section of the pneumatic gripper according to arrows B-B in FIG. 6.

As shown, the linear pneumatic gripper 10 basically comprises a gripper body 11, a control piston 12, two oscillation drive levers 13, a guide head 14, a pair of jaws 15 and a protective cover 16.

The body of the gripper 11 is made up of a base element that has, at one of its ends, two parallel tongues 17 delimiting between them an opening 17' and which are provided with two transversal bores 17".

Internally, the body forms a chamber 18 closed at one end, whereas at the opposite end, the one facing towards the tongues 17, is closed by a plug 19 with an intermediate bore 19'. Furthermore, the body 11 has bores 20 on two lateral sides and a groove 20' on each of the other two walls.

The control piston 12 is housed and slides in the chamber 18 and is equipped with a stem 21, which fits tight into the intermediate bore 19' of the plug 19 and which has at its end, on opposite sides, two puller slots 22. The piston 12 can be cylindrical or not cylindrical, single acting with a return spring, or double acting.

The two drive levers 13 are basically L shaped, assembled in a cavity 17', between the tongues 17, on the respective fulcrums or oscillation pins 24 passing through the transversal bores 17". Each of the levers has an arm connected to one of the slots 22 of the stem 21 of the piston 12.

The drive levers 13 are in this way susceptible to angular movements in opposite directions in response to the movements of the piston 12.

The guide head 14 is made up of a single block, having two lateral cavities 25 designed to mate with the tongues 17 present at the end of the body of the gripper 11. On a level with said cavities 25 are provided two bores 25' coinciding with the bores 17" in said tongues 17. Furthermore the head 14 has, in the longitudinal direction, a profiled guide groove 27 designed to receive the jaws 15 and has an opening in the bottom through which extend the other arms of the drive levers 13.

The two jaws 15 are in fact positioned and moving in said guide groove 27 to be able to carry out linear movements in opposite opening and closing directions, respectively. Each of the jaws 15 mate with the other arm of the drive levers 13 opposite to the one that mates with a slot 22 of the piston 12.

The head 14 is fixed to the body of the gripper 11 advantageously and simply by taking advantage of the same oscillation fulcrums or pins 24 of the drive levers 13.

Furthermore the transversal bores 17" of the tongues 17 of the body of the gripper and/or the bores 25' of the head 14, on one side, and the fulcrums or pins 24, on the other side, are dimensioned so as to mate with a preload for a rigid and secure mating between the body of the gripper 11 and the head 14 without the need for bolts or any other anchoring means.

Finally, the protective covering 16, is assembled and fixed astride of the guide head 14 and has only two openings 26 from which the jaws 15 protrude.

The function of the gripper 10 is in itself usual: the piston 12 causes an oscillatory movement of the drive levers 13, which in turn transmit the motion to the jaws 15 which, guided in the groove 27 of the head 14, are thus obliged to carry out linear movements in opposite opening and closing directions.

The invention claimed is:

1. A linear pneumatic gripper, comprising:
a gripper body that forms a chamber;
a piston moving alternatively in the chamber in said body under the action of a fluid under pressure; and
a pair of gripper jaws associated with said gripper body and moving linearly in opposite directions, said piston having a stem connected to the jaws by means of drive levers assembled on transversal oscillation fulcrums or pins so that the movements of the piston correspond to the linear movements of the jaws to open and close said jaws, said gripper body comprising a base element in which the chamber is provided for the piston and which holds the drive levers oscillation on relative fulcrums or pins, and a head associated with said gripper body and having a guide groove for the jaws, said head being fixed to the base element of the body of the gripper by means of the oscillation fulcrums or pins of said drive levers, said base element of the gripper body having two end tongues forming a cavity and provided with transversal bores, said cavity being located between said two end tongues, said head having two lateral cavities for mating with the tongues of said gripper body and said head having on a level with said cavities two bores coinciding with the bores of said tongues, said drive levers, basically L shaped, being assembled in said cavity between said two end tongues on the respective oscillation fulcrums or pins, said drive levers mating on one side with slots provided along the stem of the piston and each of said drive levers mating with a jaw on another side thereof.

2. A linear pneumatic gripper, comprising:
a gripper body that forms a chamber;
a piston moving alternatively in the chamber in said body under the action of a fluid under pressure; and
a pair of gripper jaws associated with said gripper body and moving linearly in opposite directions, said piston having a stem connected to the jaws by means of drive levers assembled on transversal oscillation fulcrums or pins so that the movements of the piston correspond to the linear movements of the jaws to open and close said jaws, said gripper body comprising a base element in which the chamber is provided for the piston and which holds the drive levers oscillation on relative fulcrums or pins, and a head associated with said gripper body and said head having a guide groove for the jaws, said head being fixed to the base element of the body of the gripper by means of the oscillation fulcrums or pins of said drive levers, said base element of the gripper body having two end tongues forming a cavity and said two end tongues being provided with transversal bores, said cavity being located between said two end tongues, said head having two lateral cavities for mating with the tongues of said gripper body and said head having two bores on a level with said cavities, said two bores coinciding with the bores of said tongues, said drive levers being basically L shaped, said drive levers being assembled in said cavity between said two end tongues on the respective oscillation fulcrums or pins, said drive levers mating on one side with slots provided along the stem of the piston and each of said drive levers mating with a jaw on another side thereof, wherein on one side the bores of the tongues of the body of the gripper and/or the bores of the head, and on the other side the fulcrums or pins of said drive levers are dimensioned so as to mate with a preload in order to have a rigid mating between the base element of the gripper body and the guide head.

* * * * *